United States Patent
Wen

[19]

[11] Patent Number: 5,915,858
[45] Date of Patent: Jun. 29, 1999

[54] ORGANIZING PIXELS OF DIFFERENT DENSITY LEVELS FOR PRINTING HUMAN READABLE INFORMATION ON CDS

[75] Inventor: Xin Wen, Rochester, N.Y.

[73] Assignee: Eastman Kodak Company, Rochester, N.Y.

[21] Appl. No.: 08/813,212

[22] Filed: Mar. 7, 1997

[51] Int. Cl.[6] .............................. B41J 5/30; B41J 2/435; B41F 17/00

[52] U.S. Cl. ...................... 400/61; 400/120.07; 347/224; 101/35

[58] Field of Search .................. 101/35, 41; 400/120.07, 400/120.09, 61, 70; 395/112, 109; 347/183, 188, 224, 237

[56] References Cited

U.S. PATENT DOCUMENTS

| | | | |
|---|---|---|---|
| 4,470,797 | 9/1984 | Harry et al. | 425/534 |
| 4,695,286 | 9/1987 | Vanier et al. | 8/471 |
| 4,772,582 | 9/1988 | DeBoer | 503/227 |
| 4,775,657 | 10/1988 | Harrison et al. | 503/227 |
| 4,876,235 | 10/1989 | DeBoer | 503/227 |
| 4,962,081 | 10/1990 | Harrison et al. | 503/227 |
| 4,967,286 | 10/1990 | Nomula et al. | 358/342 |
| 4,973,572 | 11/1990 | DeBoer | 503/227 |
| 5,317,337 | 5/1994 | Ewaldt | 346/1.1 |
| 5,491,045 | 2/1996 | DeBoer et al. | 430/200 |
| 5,518,325 | 5/1996 | Kahle | 400/70 |
| 5,576,267 | 11/1996 | DeBoer et al. | 503/227 |
| 5,704,021 | 12/1997 | Smith et al. | 395/109 |
| 5,715,511 | 2/1998 | Aslam et al. | 101/35 |

OTHER PUBLICATIONS

Timothy B. McSweeney, Screen Printing, Graphic Arts Manual, 1980, pp. 416–418.

*Primary Examiner*—John Hilten
*Attorney, Agent, or Firm*—Raymond L. Owens

[57] ABSTRACT

A printing apparatus and printing method for separating, image processing, and printing image objects on CD labels according to whether the image objects require multiple or two density levels.

7 Claims, 5 Drawing Sheets

ORGANIZING PIXELS OF DIFFERENT DENSITY LEVELS FOR PRINTING HUMAN READABLE INFORMATION ON CDS

CROSS REFERENCE TO RELATED APPLICATIONS

Reference is made to commonly assigned U.S. patent application Ser. No. 08/779,695, filed Jan. 7, 1997, entitled "Printing Onto Disks Such As Compact Disks and the Like", to Wen et al, U.S. patent application Ser. No. 08/779,512, filed Jan. 7, 1997, entitled "Thermal Dye Transfer Printing of Compact Disks Labels", to Wen, U.S. patent application Ser. No. 08/798,082 filed Feb. 12, 1997, entitled "Transferring Colorant From a Donor Element to a Compact Disk", to Wen et al assigned to the assignee of the present invention. The disclosure of this related application is incorporated herein by reference.

FIELD OF THE INVENTION

The present invention relates to forming human readable information on a compact disk (CD).

BACKGROUND OF THE INVENTION

A compact disk (CD) is a high-volume and long lived data-storage medium. One recordable compact disk (CD-R) contains a polycarbonate disk that is coated with a dye layer, a metallized reflective layer, and a protective layer. A CD-R will be understood to be a compact disk that can be written on, typically by a laser beam as contrasted with a CD-ROM which information is replicated by injection molding. Cyanine, phthalocyanine, and metallized azo dyes are commonly used dyes coated in a polymer binder in the dye layer. The metallized reflective layer typically consists of gold in CD-R, and aluminum in CD-ROM. In a CD writer, a laser beam illuminates the dye polymers through the polycarbonate substrate as the disk spins. The illumination is turned on and off at selective locations determined by the input digital information. The heating by the laser causes the dye layer to chemically change at these locations, forming readable marks in the dye polymer. The degraded dye polymers in the marked regions are less reflective than the unmarked regions. During the reading process, a low-power laser scans the dye polymer layer in a recorded disk. The laser light is reflected directly from the unmarked regions, but is scattered or diminished in the marked regions. A sensor monitors the transitions between the marked and unmarked regions from the intensity of the reflective light, and converts it into a digital data stream. Similar to the above process, a CD-ROM differentiates the intensity of the reflective light by pits and lands in the compact disks. These pits and lands are pre-recorded by pressing the compact disks, typically mass produced.

The CDs are often coated with a printable surface opposite to the surface from which the information is recorded and retrieved. On the printable surface, a label is printed which can be logos, trademarks, text, graphics, and bar codes, etc., which are related to the information stored on the CD. The label also protects the CD from physical damage. Because the CD spins at high speed in the writer and the player, the CD label needs to be precisely balanced to the center of the disk for smooth rotation.

Labeling of CD disks has routinely been accomplished through screen printing methods. While this method can provide a wide variety of label content, it tends to be cost ineffective for run lengths less than 300–400 disks because the fixed cost on unique materials and set-up are shared by all the disks in each run. The screen printing technique is well described in the textbook "Graphic Arts Manual", edited by Janet and Irving Field, Arno/Musarts Press, New York, N.Y., 1980, pp. 416 to 418. In screen printing a stencil of the image is prepared, placed in contact with the CD and then ink is spread by squeegee across the stencil surface. Where there are openings in the stencil the ink passes through to the surface of the CD, thus producing the image. Preparation of the stencil is an elaborate, time consuming and expensive process.

Recently, significant increases in use of CD-R disks as a data distribution vehicle have increased the need to provide customized CD label content to reflect the data content of the disk. For these applications, the screen label printing presents a dilemma as CD-R disks are designed to allow customized user information to be recorded in standardized CD formats.

Initially, the customized label information was "hand written" on the disk surface using felt tipped markers. While this method allowed users to individually identify disks, it tends to be labor intensive, prone to human error in transcription, and aesthetically limited.

Other attempts to provide a CD-R labeling solution have incorporated digitally printed adhesive labels. Label stock for this type of CD-R labeling is available from a number of sources. These allow pre-cut labels to be printed using desktop or commercial inkjet, thermal wax transfer, or printers. An example of such labels is the STOMP Company's (Irvine, Calif.) CD Stomper package of die-cut CD labels that can be printed on a page-size ink jet or laser electrophotographic printer. Following printing, the labels can be applied manually with or without the aid of an alignment tool or a specially designed machine. This method can be labor intensive. It is also prone to human error in label transfer. Damage to the CD-R can result if the label is removed. System performance problems can occur due to disk imbalance or label delamination in the CD writer or reader.

Within the past several years, methods for direct CD labeling have been growing in prominence. These methods utilize the versatility and ease of the setup associated with digital printing to provide customized label content directly on a disk surface. The most commonly used direct CD printers incorporate ink jet or thermal wax transfer technologies. Examples of such printers are the AFFEX Corporation's (2522 Chambers Road, Suite 110, Tustin, Calif.) Multi Media Color Ink Jet Printer, and the FARGO Corporation's (Eden Prairie, Minn.) Signature CD Color Printer. These printers can either stand alone or be integrated into a computerized disk writing system reducing problems associated with labor, human error, disk damage, and imbalance. Within this category of applications, U.S. Pat. No. 5,317,337 describes an apparatus and method for printing label information on a CD. Both inkjet and laser electrophotographic printing are described, but the laser electrophotographic printing is limited to printing ink onto an intermediate drum and then transferring the image to the CD label, that is, offset printing. U.S. Pat. No. 5,518,325 disclosed a method and a system for CD label printing. U.S. Pat. No. 4,967,286 disclosed a method for transforming images between coordinates for CD label printing.

In summary, prior screen printing CD-label printing techniques are not economic for printing label images on a small number of disks. The digital printing methods in the prior art do not address continuous-tone printing.

SUMMARY OF THE INVENTION

An object of this invention is to provide high quality CD with human readable information comprising image objects of both multliple density level and two density level pixels.

Another objective of this invention is to provide CD labels comprising a wide variety of image objects.

Another objective of this invention is to provide an efficient way of printing records on small number of CDs.

These objects are achieved by a method of organizing human readable information for printing on a CD, comprising the steps of:

a) receiving pixels corresponding to the human readable pixels to be printed;

b) arranging the human readable pixels in the locations to be printed on the CD;

c) separating the human readable pixels into pixels which require multiple density levels and those requiring two density levels;

d) image processing the pixels of two density levels and pixels of multiple density levels; and e) arranging the image processed pixels so that they are in a printable form.

ADVANTAGES

A feature of this invention is to provide a method that efficiently prints image objects on CD labels according to the image object type such as being in multiple or two density levels.

Another feature of the present invention is that it is applicable to a wide variety of printing techniques.

Another feature of the present invention is that it is applicable to a wide variety of image types.

A still further feature of this invention is that it can be applied to many system configurations that can be optimized for the ease of use for the customers.

DETAILED DESCRIPTION OF THE INVENTION

The present invention is described with relation to a compact disk which can include a CD-ROM and a CD-R, it will be understood that it also can be directly applied to newer forms of disks such as those called digital versatile disks or DVD. So when the term CD is used, it will be understood to include all of these types of disks. The term CD label as used throughout this specification will be understood to those skilled in the art to include digital data such as bar codes, analog data such as text, graphics such as line art, pictorial information such as colored images or combinations thereof and the like.

The following paragraphs describe a CD label printing system based in laser infrared thermal dye transfer technique. The details of this printing method are disclosed in the co-pending U.S. application Ser. No. 08/798,082, filed Feb. 2, 1997, entitled "Transferring Colorant From a Donor Element to a Compact Disk", to Wen et al assigned to the assignee of the present invention. It is understood that this printing technique is used only as an example in the present invention. The teachings in the present invention is applicable to other printing techniques.

Figure 1:
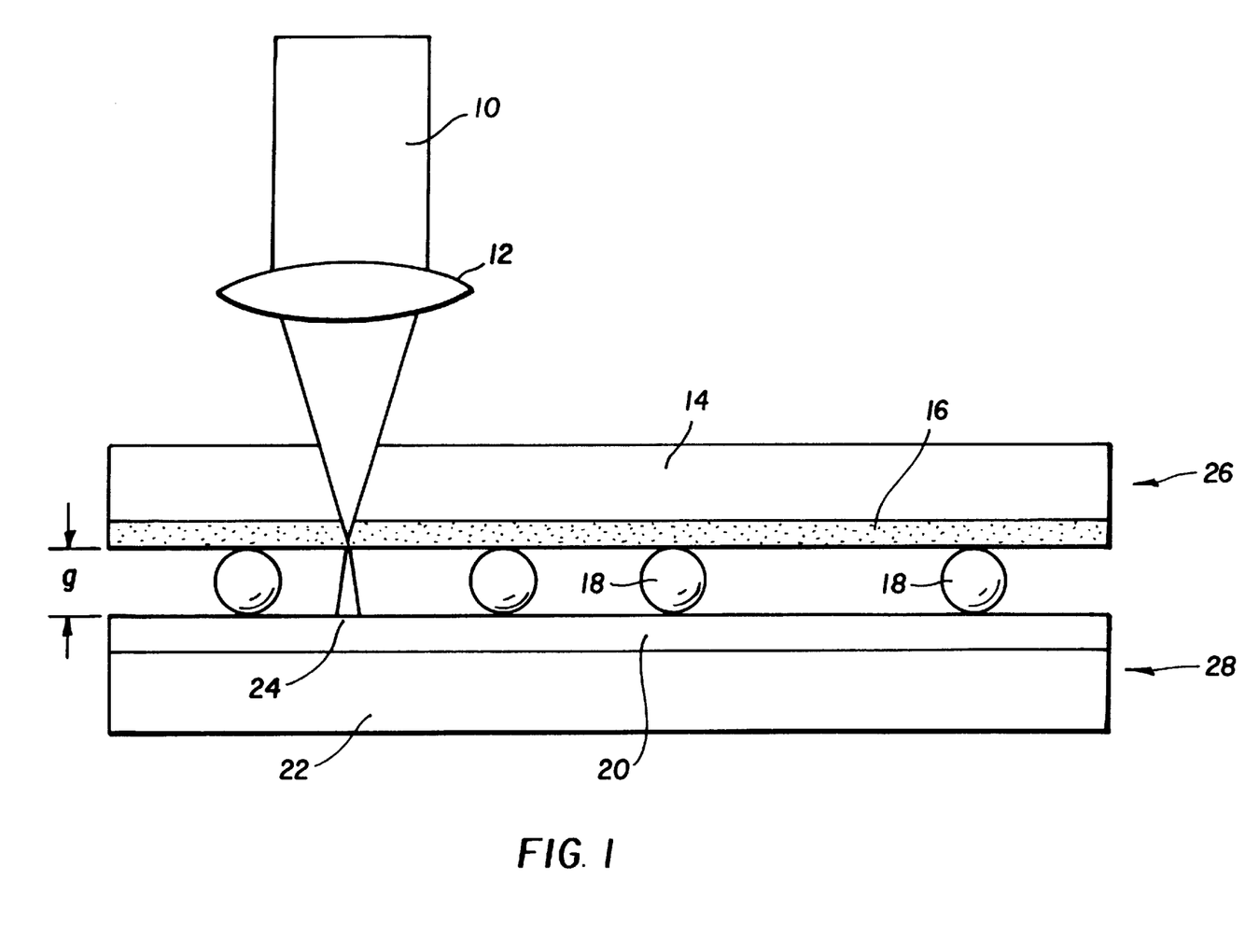
FIG. 1 is a partial schematic view showing an apparatus for printing records on CD disks using infrared laser thermal transfer wherein the CD is in transferable relationship with a colorant donor element.

Referring to FIG. 1, a diode laser beam 10 is shown being focused by a lens 12 through a transparent donor element support 14 onto a color layer 16 which contains a) an absorber for the laser beam to generate heat; b) a colorant to transfer to the disk record layer 20 which is coated on the disk support polymer 22 to produce a transferred colored pixel 24 of the desired image; c) a polymeric binder to hold the colorant in the layer. The heat generated by the absorption of the laser beam causes the colorant to evaporate, sublime, or ablatively transfer from the donor element layer to the disk 28. Between the donor element and the disk are deposed spacer beads 18 to maintain a fixed gap "g" between the donor element 26 and the disk record layer 20. Throughout this specification, whenever the term colorant is used, it will be understood to includes dyes, pigments, or transferable materials which can form a dichroic filter or the like. After the first color is printed, the donor element is removed without disturbing the position of the disk, the second color donor element is placed in position, and the printing process is repeated with the second digital color record. Generally three color donor elements are required for a full color image; cyan, magenta and yellow, corresponding to the red, green and blue color separations of the digital image.

The colorants in the color layer can be chosen from a number of dyes or pigments. It is important that the colorant have a clean, strong hue, with good color saturation and little unwanted absorption in the optical region of the electromagnetic spectrum. The colorant should also have a low thermal mass, so the minimum amount of heating is required to cause the colorant to transfer from the donor element to the receiver. Throughout this specification, whenever the term "thermal mass" is used, it will be understood to mean the weight, or mass, of material that will be raised a given temperature by a given amount of energy (a given number of Joules). Exemplary dyes that can be use can be found in commonly assigned U.S. Pat. No. 5,576,267 to DeBoer et al, the disclosure of which is hereby incorporated by reference.

The polymeric binder for the colorant can be chosen from the common film forming thermoplastic polymers, such as cellulose acetate, cellulose acetate propionate, polyvinylbutyral, nitrocellulose, and the like. Exemplary binder polymers can be found in U.S. Pat. No. 5,491,045, the disclosure of which is hereby incorporated by reference.

The disk record layer 20 on the disk can be chosen from a number of film forming polymers such as polycarbonates, polyesters, and polyacrylates, for example. It should be noted that it is possible for the composition of the polymeric receiver layer to be the same as that of the disk support polymer 22, that is, the disk can be written on directly, without coating a separate disk record layer 20. A different polymer may be chosen to optimize the performance of the disk. The disk record layer 20 may be coated over the entire surface of the disk, or may cover only a portion of the surface. The disk record layer 20 may contain addenda such as surfactants to aid in coating, or opacification agents such as titanium dioxide and the like to provide a white reflective surface. Exemplary polymers can be found in U.S. Pat. Nos. 4,695,286; 4,470,797; 4,775,657; and 4,962,081, the disclosure of which is hereby incorporated by reference. Factors dictating the proper choice of the receiver polymer layer are compatibility with the colorant, abrasion resistance, water and fade resistance of the image, cost and manufacturability. A proper choice of the polymeric receiver layer and the colorant will provide a relatively permanent record. The term "relatively permanent" as used throughout this specification will be understood to those skilled in the art to mean that labeled disk, in the normal course of use and storage will not undergo significant change over a period of many years.

The absorber can be a dye or a pigment. Ideally, the absorber should have high absorption for a given thermal mass, and should not transfer to the receiver in any significant way that might contaminate the colors of the image.

Exemplary dyes that can be used as absorbers can be found in U.S. Pat. No. 4,973,572, the disclosure of which is hereby incorporated by reference.

The spacer beads 18 in FIG. 1 can be polymeric, crosslinked or not, inorganic materials such as sand, glass, or metal, as long as they are insoluble in the solvent or binder that they are coated in. The shape of the beads can be symmetric, such as spherical, or asymmetric, provided the range of the average diameter is no more than 50% of the average diameter. The spacer beads can be located either in the receiver layer, as exemplified by U.S. Pat. No. 4,876,235 or in the donor element, as exemplified by U.S. Pat. No. 4,772,582, the disclosures of which are hereby incorporated by reference. The purpose of the beads is to provide spacing so that the gap "g" remains constant through the process of transferring colorant. The details of size, number and distribution of the beads are also given in the above references.

Figure 2:
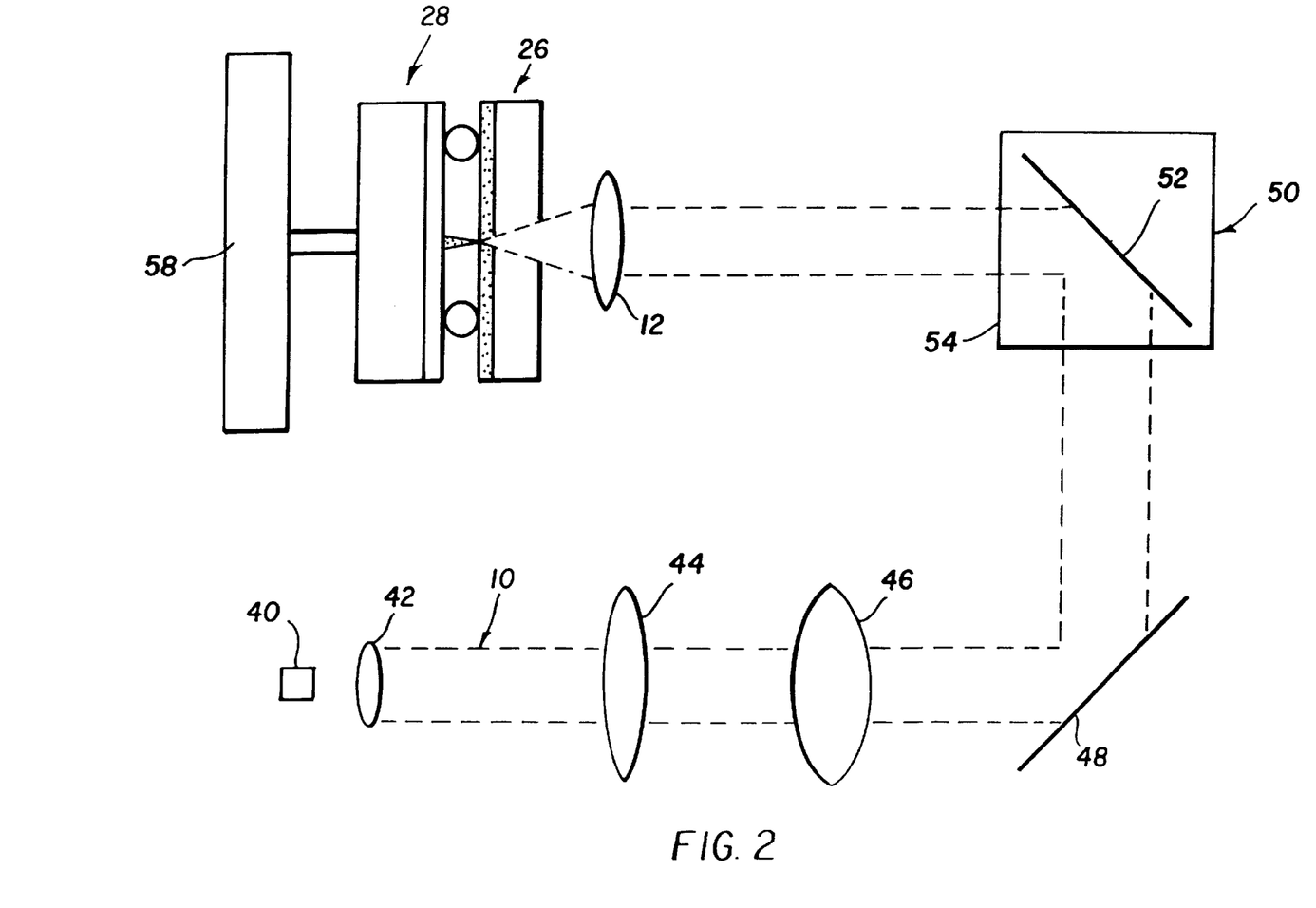
FIG. 2 is an apparatus showing an arrangement for scanning a laser beam across a record which is focused on a dye donor element for transfer of the record to a compact disk.

FIG. 2 shows a laser diode 40 which emits a beam 10 of laser light which passes through collimating lens 42, beam shaping lenses 44 and 46 and reflects off a fixed mirror 48. A galvanometer structure 50 includes a moving mirror 52 and a motor 54 which oscillates or nutates the beam of light which was reflected from the fixed mirror 48. The motor 54 controls the position of the moving mirror 52 so as to provide relative movement between the disk surface and the laser beam and modulating the laser beam in correspondence with a data record, thereby effecting laser thermal colorant transfer from the donor element to the disk in correspondence with a desired data record. The position of the laser beam is thereby controlled by the galvanometer structure 50. It will be noted that an F-theta lens 12 is provided between the disk surface and the moving mirror 52 and is adapted to focus the beam onto the donor element. The position of the moving mirror 52 controls the position of the laser spot in one direction, and an action mechanism 58 moves the CD to control the relative position of the laser spot in an orthogonal direction opposite to that provided by the moving mirror 52. Other means of translation can also be employed, such as two galvanometers, or a linear motor to translate the disk. Although the figure shows a diode laser for illustration, other lasers can be used, such as gas lasers or solid state lasers. Other optical paths are also possible.

The laser beam can be focused to approximately the same size as the wavelength of light emitted by the laser. For a near infra-red laser this is a spot size of about one micron. This small size assures that a high quality photographic image can be printed. Modulation of the intensity of the beam allows many levels of color, from very light to very dark, to be printed at any given pixel of the image.

Figure 3:
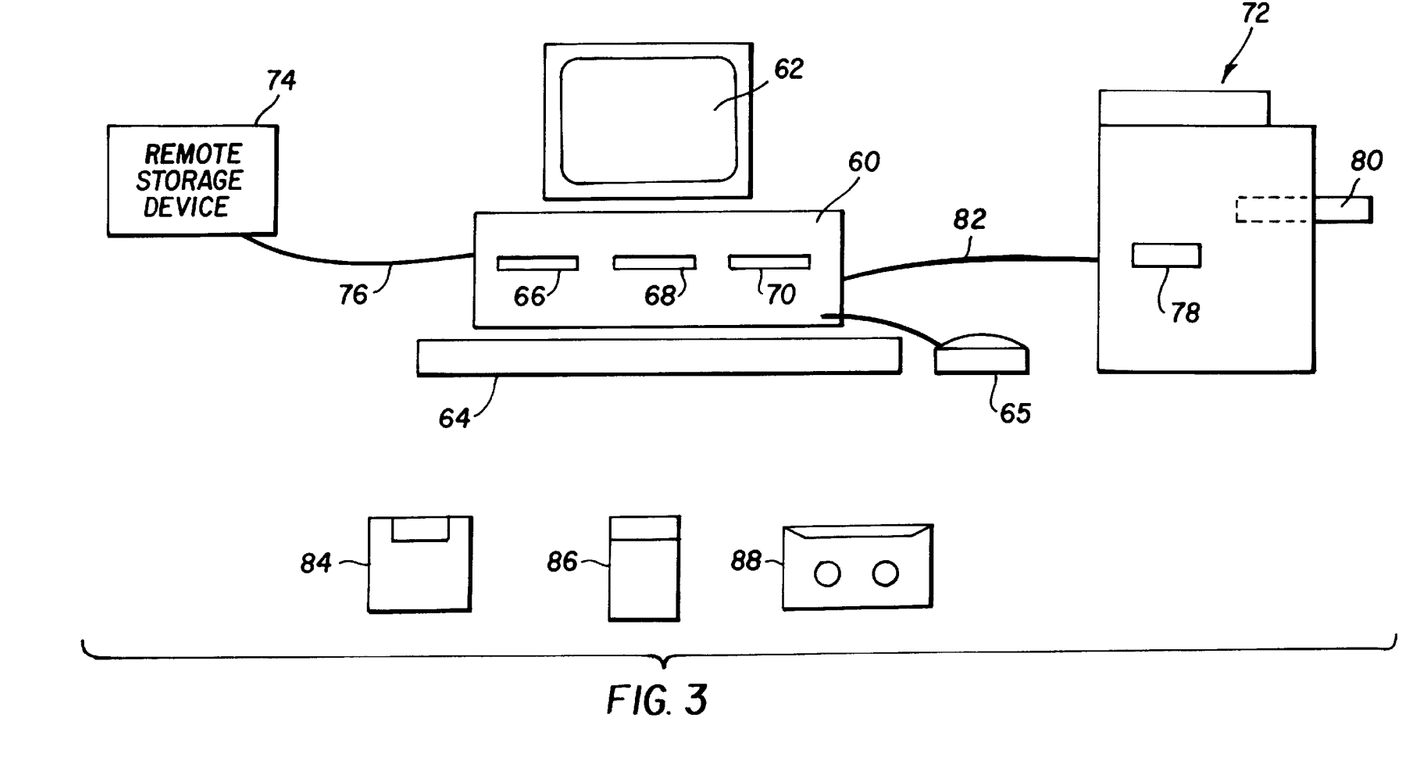
FIG. 3 is a block diagram showing the system for printing CD labels in the present invention.
Figure 4:
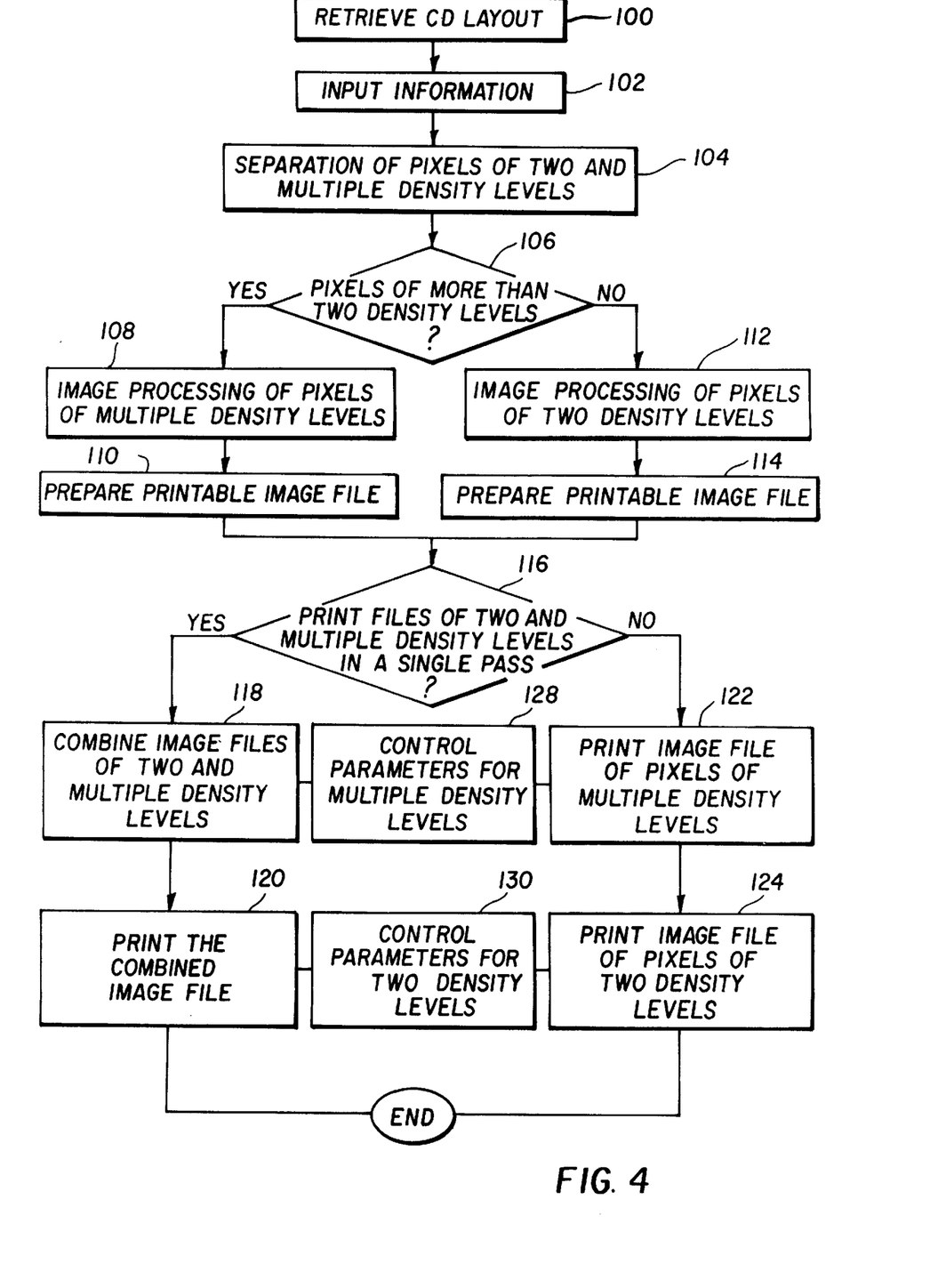
FIG. 4 is a flow chart of the image processing algorithm in the present invention.
Figure 5:
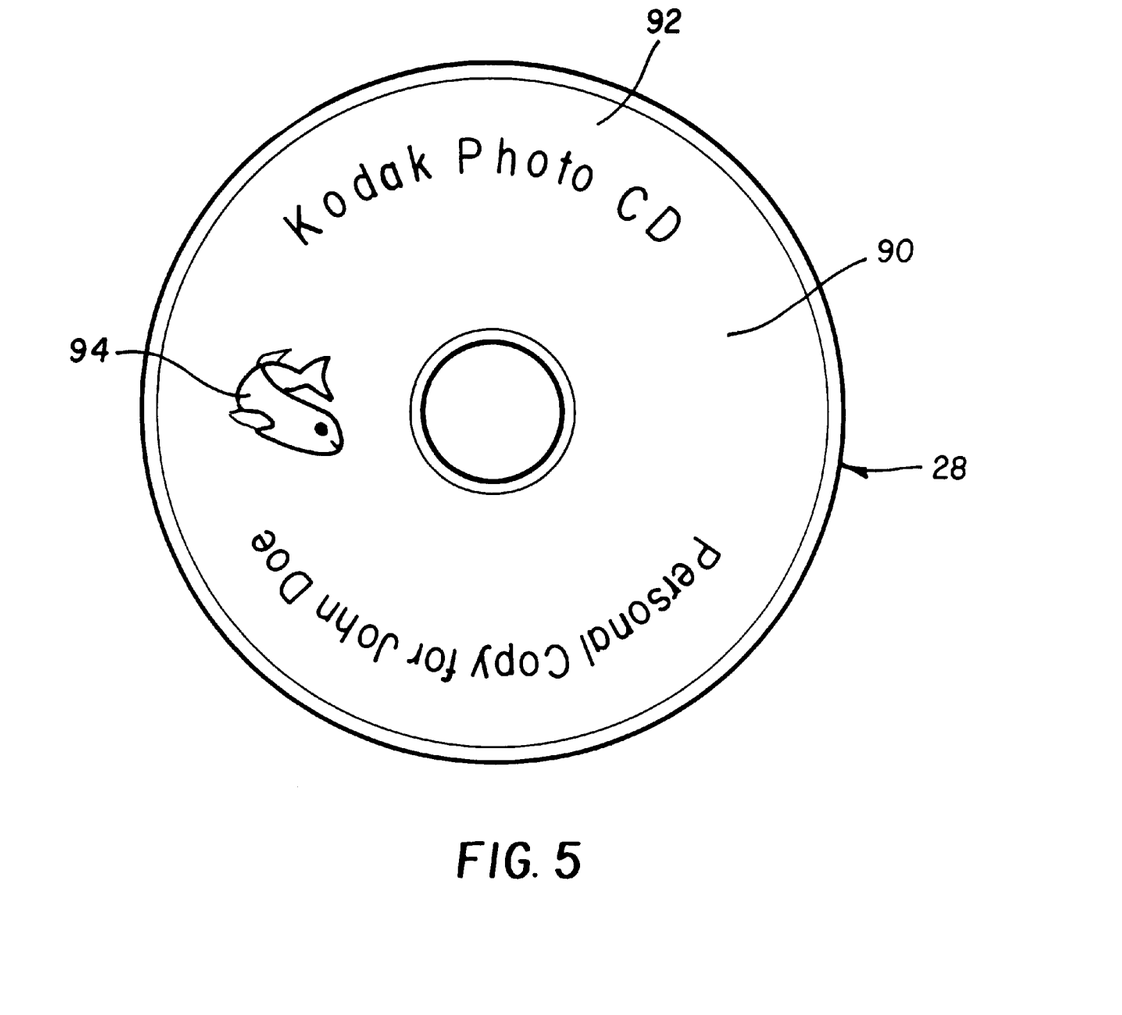
FIG. 5 is a plan view of the layout of a CD label on a CD.

Other aspects of the present invention are now described. FIG. 3 illustrates a block diagram for the invention system. FIG. 4 is a flow chart of the image processing algorithm in the present invention. FIG. 5 is a plan view of the layout of a CD label in the present invention.

Referring to FIG. 3., the invention system comprises a computer 60 that can transfer information with a CD label printer 72 through communication means 82. The computer comprises a monitor 62 for displaying control commands and the layout of a CD label 90 (FIG. 5), a keyboard 64 and a mouse for information or control input. The computer 60 comprises several means for information retrieval such as computer disk drive 66, computer card port 68, and computer tape drive 70 for retrieving information from computer disk 84, computer card 86 and computer tape 88, respectively. Throughout this invention, the term computer disk 84 can be a memory disk such as a magnetic disk, optical disk and the like that can record information. The term computer card 86 refers to PCMCIA cards and the like that can carry information. The term computer tape 88 is a magnetic tape or the like for storing information. The computer 60 can also be connected with a remote storage device 74 which can represent a computer memory or a web site on the network through communication means 76. The network can be local area network, wide area network, internet and like. The communications means 76 and 82 can be cables, telephone lines, optical fibers, infrared or radio transmitters and the like. The printer 72 can comprise a means for transporting a CD such as a CD carrier 80, a firmware or read-only-memory (ROM) 78 for storing information such as CD label information and control parameters for print head and engine, and the information retrieval means that the computer comprises as illustrated in FIG. 3.

The implementation of the present invention is now described. At the start of the operation, referring to FIG. 4, a CD design layout is first retrieved in block 100 from the computer disk drive 66, or the computer card port 68, or the computer tape drive 70, or a remote storage 74, or the firmware or ROM 78 in the printer. An example of a layout of a CD label is illustrated in FIG. 5. The layout of the CD label 90 comprises an image file that defines the borders of the CD label as well as the locations of image object including pixels of two density levels 92 and pixels of multiple density levels 94. Whenever the term "multiple density level" is used in this specification and claims, it will refer to three levels or more of density.

The term image object as used throughout this specification will be understood to those skilled in the art to include digital data such as bar codes, analog data such as text, graphics such as line art, pictorial information such as colored images or combinations thereof and the like (FIG. 5). Some image objects such as bar codes, text, or certain graphics are best displayed only with one level of the colorant density on the CD label. These image objects are referred to as pixels of two density levels 92 (FIG. 5). Some other image objects are best displayed in multiple levels of colorant densities on the CD label. These image objects are referred to as pixels of multiple density levels 94 (FIG. 5). The above described two level (bi-modal) and multiple density level pixels can be either monochromatic or in multiple colors.

The next step of the operation is the input of the information (see block 102) specific to CD label. The information can be entered or designed from the keyboard 64 and the mouse 65 with assistance of the display on the monitor 62, or retrieved from an information retrieval devices such as the computer disk 84, the computer card 86, the computer tape 70, a remote storage 74, or the firmware or ROM 78 in the printer. The image objects (FIG. 5) can exist in many forms such as a page-description language such as Postscript, or a image format such as bitmap, JPEG, TIF, Photoshop, and so on. The pictorial image objects can be originated from scanning a photogrphic film or a photographic print, an electronic or digital camera, or a computer design and so on.

After the design of the CD label is completed, referring to FIG. 4, the image objects are sorted according to the colorant density levels: bi-modal or multiple density levels (see blocks 100 and 106). The bi-modal and pixels of multiple density levels are processed separately. The image processing for the pixels of multiple density levels 94, shown in block 108, can include resizing, coordinate transformation, tone scale adjustment, color management, multi-level halftoning (or multitoning), rasterization, separation of swaths, masking, and so on. The pixels of multiple density levels are then prepared in a printable bitmap image (in block 100) which specifies the extent of colorant transfer at each pixel of the printable bitmap image file. For ink jet printing, the extent of colorant transfer can be achieved by the number of ink droplets by each of the color print heads (yellow, magenta, cyan, black, red, green, blue etc.) or by ink droplets with different colorant concentrations. For a thermal resistive printing, the extent of colorant transfer can be defined by number of electric heating pulses (pulse count modulation) or width of electric heating pulses (pulse width modulation). For a laser infrared thermal dye printing, the extent of colorant transfer can be defined by number of laser pulses (pulse count modulation) or width of laser pulses (pulse width modulation). For each of printing techniques, the printable CD label can be coated with a colorant receiving layer optimized for receiving colorant for that printing method.

Image processing of pixels 92 of two density levels is accomplished in block 112 and includes resizing, coordinate transformation, color management, halftoning, image filtering such as sharpening, line smoothening, rasterization, separation of swaths, masking, and so on. The pixels of two density levels 92 are then prepared in a printable bitmap image file, as shown in block 114, which specifies the pixel locations where colorant is transferred.

In the next step of the operation, still referring to FIG. 4, a decision, as shown in block 116, will be made whether to print the pixels of multiple density levels and the pixels of multiple density levels in a two printing pass or separate printing pass. If a two printing pass is selected, the printable bitmap images for the pixels of multiple density levels and pixels of multiple density levels will be combined into one printable image file, as shown in block 118. The locations and borders as well as the content of the image objects are stored. Printing of the combined image is a two pass process which is illustrated in block 120. When the print heads cross the borders between the pixels of multiple density levels and the pixels of multiple density levels during printing, as shown in FIG. 5, the print head and engine control automatically switch the printing control parameters for one type of image objects to the printing control parameters, shown in blocks 128 and 130, respectively, for the other type of image objects. The printing control parameters in blocks 128 and 130 are stored in the firmware or ROM 78 (FIG. 3) in the printer or sent from the computer 60.

If the option of separate printing passes is selected, the pixels of multiple density levels and the two density level printable bitmap image files are printed sequentially in blocks 122 and 129. When each of the two printable bitmap image files is printed, the corresponding printing control parameters in blocks 128 and 130 optimize that printing step. The sequence of the pixels of multiple density levels and bi-modal printing steps can be optimized for higher printing efficiency. For example, printing pixels of multiple density levels image an ink jet printer can involve the ejection of multiple ink droplets for generating multiple density levels, which requires longer dry time than bi-modal printing. In such a CD label printing system, it is more efficient to print the pixels of multiple density levels 94 before the pixels of multiple density levels.

The invention has been described in detail with particular reference to certain preferred embodiments thereof, but it will be understood that variations and modifications can be effected within the spirit and scope of the invention.

| Parts List | |
|---|---|
| 10 | beam |
| 12 | F-theta lens |
| 14 | donor element support |
| 16 | color layer |
| 18 | spacer beads |
| 20 | disk record layer |
| 22 | disk support polymer |
| 24 | transferred colored pixel |
| 26 | donor element |
| 28 | disk |
| 40 | laser diode |
| 42 | lens |
| 44 | lens |
| 46 | lens |
| 48 | fixed mirror |
| 50 | galvanometer structure |
| 52 | moving mirror |
| 54 | motor |
| 58 | action mechanism |
| 60 | computer |
| 62 | monitor |
| 65 | mouse |
| 66 | computer disk drive |
| 68 | computer card port |
| 70 | computer tape drive |
| 72 | CD label printer |
| 74 | remote storage device |
| 76 | communication means |
| 78 | a firmware or ROM |
| 80 | CD carrier |
| 82 | communication means |
| 84 | computer disk |
| 86 | computer card |
| 88 | computer tape |
| 90 | CD label |
| 92 | pixels of two density levels |
| 94 | pixels of multiple density levels |
| 100 | retrieve CD layout block |
| 102 | input information block |
| 104 | not mentioned in spec |
| 106 | decision block |
| 108 | image processing |
| 110 | not mentioned in spec |
| 112 | image processing |
| 114 | prepare printable image file |
| 116 | decision block |
| 118 | block |
| 120 | print block |
| 122 | block |
| 124 | not mentioned in spec |
| 128 | block |
| 130 | block |

I claim:

1. A method of organizing human readable information and printing such information on a CD using a modulated laser beam, comprising the steps of:

a) receiving pixels corresponding to the human readable pixels to be printed;

b) arranging the human readable pixels into predetermined locations to be printed on the CD;

c) separating the human readable pixels into pixels which require continuous tone printing and those requiring two density levels;

d) image processing the two density levels and the continuous tone printing pixels;

e) arranging the image processed pixels so that they are in a printable form; and f) laser printing the continuous tone printing pixels and the two density levels pixels in the predetermined locations.

2. The method according to claim 1 further including preparing separate printable image files of the two levels and the continuous tone printing pixels.

3. The method according to claim 2 further including combining pixels of two levels and continuous tone printing into a single print file.

4. A method of organizing and printing human readable pixels for printing on a CD having a recording layer, comprising the steps of:

a) receiving pixels corresponding to the human readable pixels to be printed;

b) arranging the human readable pixels into predetermined locations to be printed on the CD;

c) separating the human readable pixels into pixels which require continuous tone printing and those requiring two levels of density;

d) image processing the two density level and the continuous tone printing pixels;

e) arranging the image processed pixels so that they are in a printable form;

f) providing a colorant transfer device in colorant transferable relationship to a surface of the CD; and g) transferring colorant from the colorant transfer device in accordance with the image processed two level and continuous tone printing pixels to the CD recording layer to thereby provide a human readable pixels in the predetermined locations.

5. The method according to claim 4 further including preparing separate printable image files of the two level and the continuous tone printing pixels.

6. The method according to claim 4 further including combining the two level and the continuous tone printing pixels into a two level print file.

7. The method according to claim 4 wherein the colorant transfer device includes a donor element having transferrable colorant and the transferring step includes positioning the donor element in colorant transferrable relationship so that it is adapted to transfer colorant onto the recording layer of the CD.

* * * * *